US009506471B2

(12) United States Patent
Eslinger

(10) Patent No.: US 9,506,471 B2
(45) Date of Patent: Nov. 29, 2016

(54) RADIAL BEARING ASSEMBLY FOR CENTRIFUGAL PUMP

(75) Inventor: David Eslinger, Collinsville, OK (US)

(73) Assignee: Schlumberger Technology Corporation, Sugar Land, TX (US)

(*) Notice: Subject to any disclaimer, the term of this patent is extended or adjusted under 35 U.S.C. 154(b) by 897 days.

(21) Appl. No.: 13/432,064

(22) Filed: Mar. 28, 2012

(65) Prior Publication Data

US 2013/0259706 A1   Oct. 3, 2013

(51) Int. Cl.
| | | |
|---|---|---|
| F16C 17/02 | (2006.01) | |
| F04D 13/10 | (2006.01) | |
| F04D 29/047 | (2006.01) | |
| F16C 33/10 | (2006.01) | |
| F04D 7/04 | (2006.01) | |

(52) U.S. Cl.
CPC .............. F04D 7/04 (2013.01); F04D 13/10 (2013.01); F04D 29/047 (2013.01); F16C 17/02 (2013.01); F16C 17/026 (2013.01); F16C 33/108 (2013.01); F16C 33/1065 (2013.01)

(58) Field of Classification Search
CPC .. F16C 17/02; F16C 17/026; F16C 33/1025; F16C 33/103; F16C 33/1045; F16C 33/1055; F16C 33/106; F16C 33/1065; F04D 29/04; F04D 29/046; F04D 13/08; F04D 13/10
USPC .......... 417/423.12, 424.1, 424.2; 384/97, 98, 384/132, 135, 144, 275, 276, 282, 283, 289, 384/291, 292
See application file for complete search history.

(56) References Cited

U.S. PATENT DOCUMENTS

| | | | | |
|---|---|---|---|---|
| 1,877,495 | A * | 9/1932 | Cater | F16C 17/026 384/292 |
| 3,484,143 | A * | 12/1969 | Sibley et al. | 384/108 |
| 4,741,668 | A | 5/1988 | Bearden | |
| 4,781,531 | A | 11/1988 | James | |
| 4,838,758 | A | 6/1989 | Sheth | |
| 4,872,808 | A | 10/1989 | Wilson | |
| 5,209,577 | A * | 5/1993 | Swatek | E21B 4/003 384/220 |
| 6,012,900 | A * | 1/2000 | Kennedy et al. | 415/199.2 |
| 6,106,224 | A * | 8/2000 | Sheth et al. | 415/104 |
| 6,935,787 | B2 * | 8/2005 | Li | 384/292 |
| 7,938,582 | B2 * | 5/2011 | Barlerin et al. | 384/292 |
| 8,894,350 | B2 * | 11/2014 | Brunner et al. | 415/107 |

OTHER PUBLICATIONS

Tong et al., "Abrasive wear of embossed surfaces with convex domes", Wear 274-275 (2012) p. 196-202.

* cited by examiner

Primary Examiner — Peter J Bertheaud
(74) Attorney, Agent, or Firm — Michael Stonebrook

(57) ABSTRACT

A radial bearing assembly for a centrifugal pump can include a first component that has a longitudinal axis and that includes discrete radial surfaces separated by undercuts, the discrete radial surfaces disposed at a radial distance from the longitudinal axis; a second component that has a longitudinal axis and that includes a radial surface disposed at a radial distance from the longitudinal axis; and, formed by concentric alignment of the longitudinal axis of the first component and the longitudinal axis of the second component, a journal and bearing clearance, defined by the difference between the radial distance of the radial surfaces of the first component and the radial distance of the radial surface of the second component, and axially deviant particle passages defined by the undercuts and the radial surface of the second component. Various other apparatuses, systems, methods, etc., are also disclosed.

15 Claims, 9 Drawing Sheets

RADIAL BEARING ASSEMBLY FOR CENTRIFUGAL PUMP

BACKGROUND

Multistage centrifugal pumps used for pumping can pump various types of fluids, some of which may include solids. In a multistage centrifugal pump, an individual stage includes an impeller that, upon rotation, acts to move fluid. Such an impeller may be connected to a motorized shaft. In a multistage centrifugal pump, two or more impellers are connected to a single shaft, which may be a unitary or multi-piece shaft. To support such a shaft, a multistage centrifugal pump includes one or more radial bearing assemblies where each radial bearing assembly provides for a bearing interface. A bearing interface includes two surfaces where one may be referred to as a journal surface and the other may be referred to as a bearing surface. During operation of a multistage centrifugal pump, the journal surface of a radial bearing assembly rotates at a rotational speed that exceeds that of a corresponding bearing surface of the radial bearing assembly, which may be stationary. To allow for such differential rotation, a clearance exists between the two surfaces, however, the clearance may be limited in size (e.g., radial distance) to help minimize tilt of a shaft in a multistage centrifugal pump. Depending on any of a variety of factors, such as shaft length, number of stages, etc., a multistage centrifugal pump may include multiple radial bearing assemblies. Various examples of technologies, techniques, etc., described herein relate generally to radial bearing assemblies for centrifugal pumps.

SUMMARY

As an example, a radial bearing assembly for a centrifugal pump can include a component that includes radial surfaces separated by undercuts, another component that includes a radial surface and, formed by concentric alignment of the two components, a journal and bearing clearance and particle passages defined by the undercuts of the component and the radial surface of the other component. As an example, an electric submersible pump can include a rotatable shaft, an electric motor for rotating the rotatable shaft; and at least one radial bearing assembly that includes particle passages. As an example, a method can include providing a centrifugal pump that includes at least one radial bearing assembly that includes particle passages, driving the centrifugal pump to pump a slurry, and passing the slurry through the particle passages. As an example, a radial bearing assembly can include a component that includes radial surfaces separated by undercuts, another component that includes a radial surface and, formed by concentric alignment of the two components, journal and bearing clearances defined by respective radial surfaces of the component and the radial surface of the other component, and particle passages defined at least in part by the undercuts of the component and the radial surface of the other component.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Multistage centrifugal pumps used for pumping (e.g., downhole or surface) can pump fluids with solids, which may be referred to as slurries. During pumping, slurries can cause erosive and abrasive wear to pump components. Abrasive wear can occur at close fitting, diametrical interfaces between, for example, a stationary component and a rotating component. As an example, consider an assembly for a shaft-driven pump impeller that includes a radial bearing assembly that surrounds a rotating shaft where a small annular clearance exists between two surfaces of the radial bearing assembly (e.g., a journal surface and a bearing surface). Where such an impeller pumps a slurry, solids may become entrained in the annular clearance and cause abrasive wear of one or both surfaces of the components that define the annular clearance. Abrasive wear of one or more radial bearing assembly features can increase running clearance and allow the rotating shaft and impeller assembly to wobble (e.g., tilt) or nutate during operation. Shaft wobble can increase pump vibration and nutation of the rotating assembly can increase wear rate of radial clearance seal features on an impeller and any associated components such as a diffuser or diffusers and thereby increase pump leakage losses. As described in various examples, one or more pump components may include a feature or features that allow for passage of at least some solids (e.g., solids in a slurry). As described in various examples, one or more features that allow for passage of at least some solids may allow for more consistent pump performance, for example, by reduction of pump leakage losses associated with abrasive wear.

Figure 1:
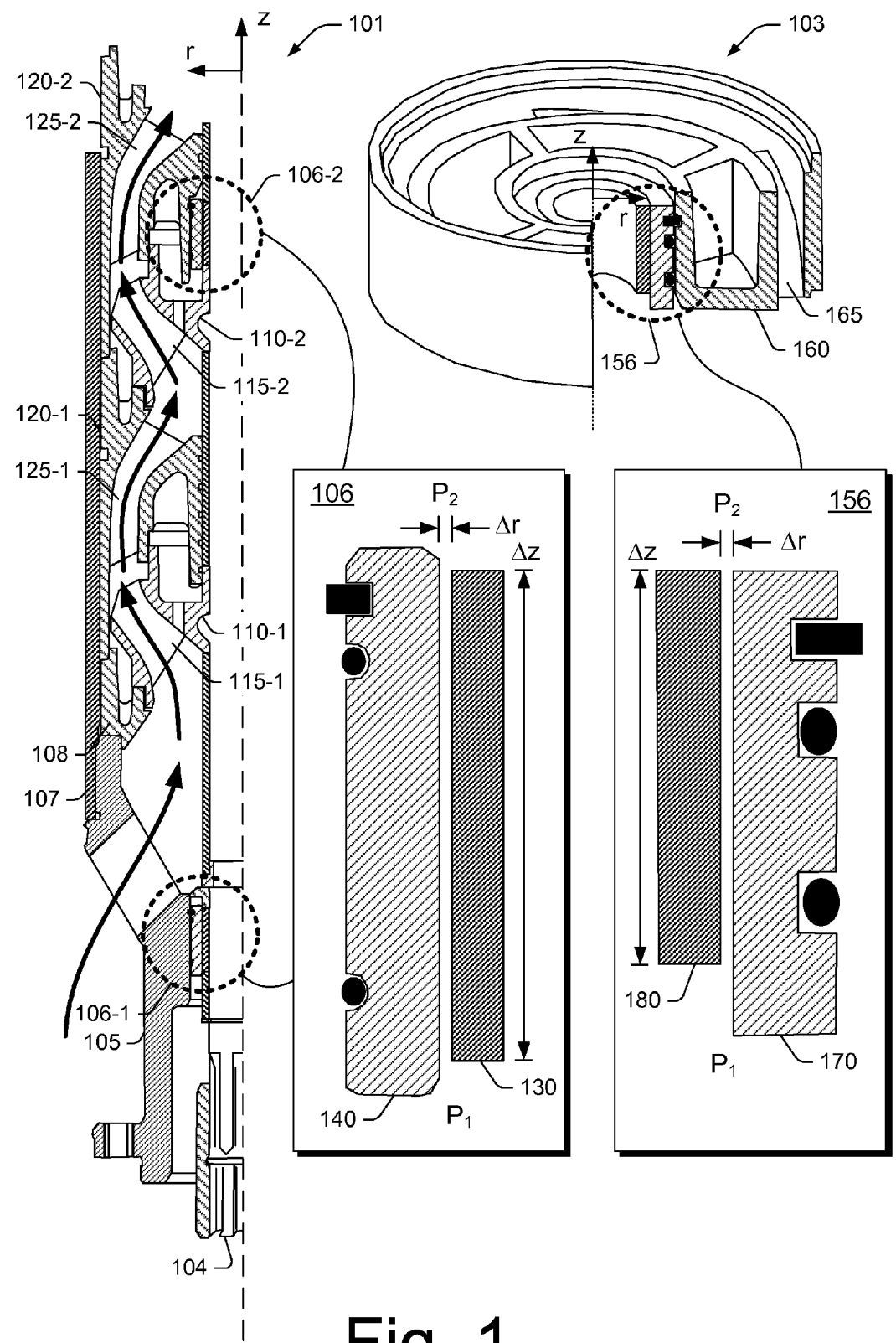
FIG. 1 illustrates examples of pumping equipment.

FIG. 1 shows a cross-sectional view of a portion of a multistage centrifugal pump assembly 101 and a perspective cut-out view of a bearing mount assembly 103 for a multistage centrifugal pump. A multistage centrifugal pump assembly includes various components such as, for each individual pump stage, an impeller to move fluid and a diffuser to direct fluid. For example, from a lower axial position to an upper axial position with respect to a z-axis, the assembly 101 includes a shaft 104, an inlet component 105, a first radial bearing assembly 106-1, a shell component 107, a seating component 108, a first impeller 110-1 with impeller vanes 115-1, a first diffuser 120-1 with diffuser vanes 125-1, a second impeller 110-2 with impeller vanes 115-2, a second diffuser 120-2 with diffuser vanes 125-2, and a second radial bearing assembly 106-2. As to the bearing mount assembly 103, it includes a radial bearing assembly 156 disposed in a mount component 160 that includes diffuser vanes 165.

As shown by arrows with respect to the assembly 101, fluid may be drawn upward into the multistage centrifugal pump assembly 101 via an opening or openings in the inlet component 105 as the impellers 110-1 and 110-2 are rotated by the shaft 104. Fluid exiting each impeller 110-1 and 110-2 is then directed in primarily an axial direction by a respective diffuser 120-1 and 120-2.

To support rotation of the shaft 104, in the example of FIG. 1, the multistage centrifugal pump assembly 101 includes at least two radial bearing assemblies 106-1 and 106-2. As shown in FIG. 1, the radial bearing assembly 106-1 is positioned between the shaft 104 and the inlet component 105 while the radial bearing assembly 106-2 is positioned between the shaft 104 and the diffuser component 120-2. For the bearing mount assembly 103, the radial bearing assembly 156 is positioned between a shaft (not shown) and the mount component 160.

An enlarged cross-sectional view shows a radial bearing assembly 106 representative of the radial bearing assemblies 106-1 and 106-2 and another enlarged cross-sectional view shows the bearing assembly 156. The radial bearing assembly 106 includes a journal component 130 and a bearing component 140 with a radial clearance $\Delta r$ that has an axial length $\Delta z$. As an example, the journal component 130 may be a sleeve configured for receipt by the shaft 104; alternatively, a shaft may serve as a journal component and provide a journal surface. The radial bearing assembly 156 includes a journal component 180 and a bearing component 170 with a radial clearance $\Delta r$ that has an axial length $\Delta z$. As an example, the journal component 180 may be a sleeve configured for receipt by a shaft; alternatively, a shaft may serve as a journal component and provide a journal surface. For both the radial bearing assembly 106 and the radial bearing assembly. 156, first and second pressures are shown as $P_1$ and $P_2$, which may determine a driving force (e.g., pressure differential) for flow of fluid in the radial clearance. As mentioned, such fluid may include solids (e.g., particles) and may be considered a slurry. Depending at least in part on the pressures, fluid may flow axially upward or axially downward in a radial clearance defined by a journal component and a bearing component of a radial bearing assembly.

Figure 2:
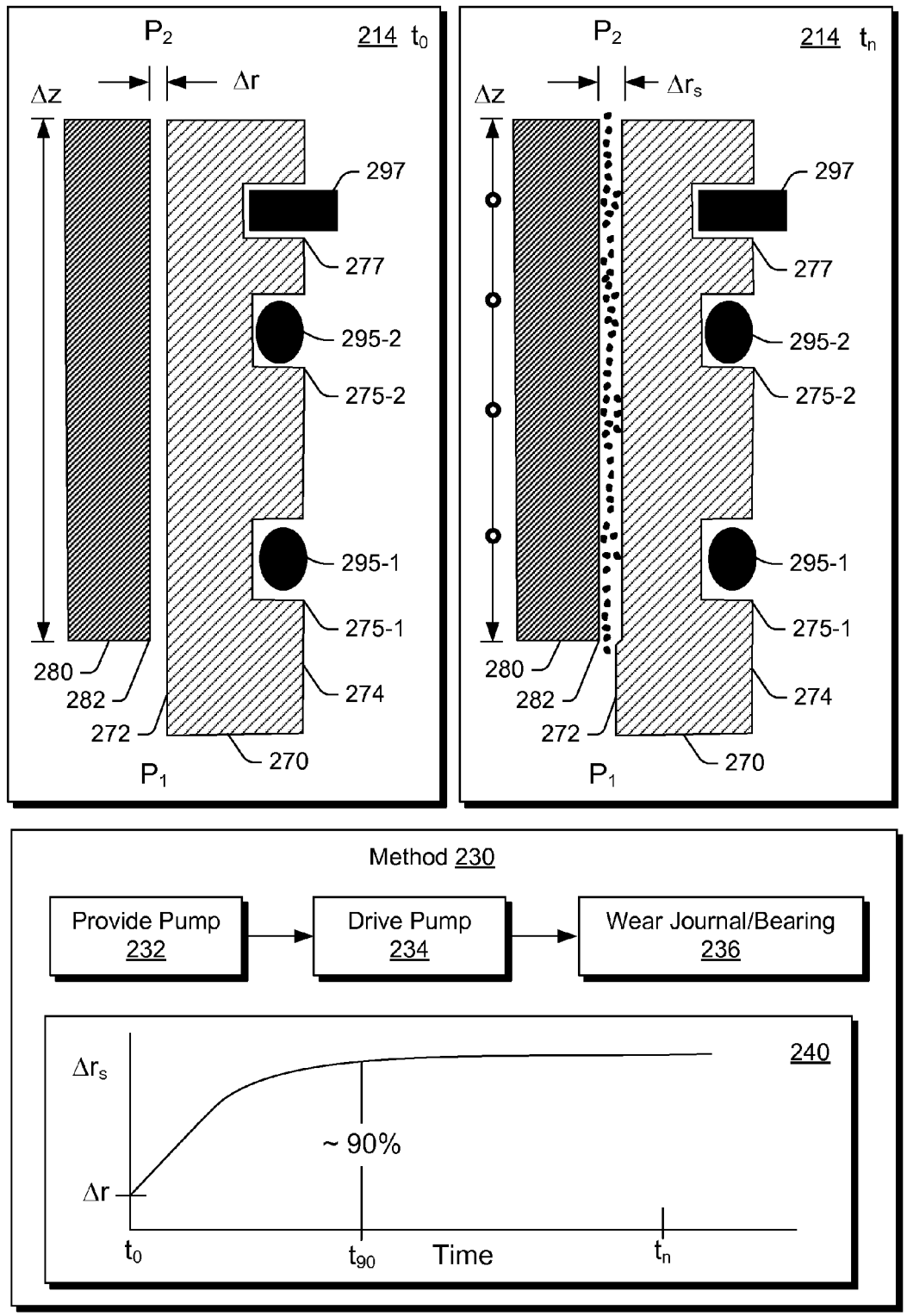
FIG. 2 illustrates an example of abrasive wear of a radial bearing assembly.

FIG. 2 shows an example of a radial bearing assembly 214 at a first time ($t_0$) and an example of the radial bearing assembly 214 at a second, later time ($t_n$). In the examples of FIG. 2, the journal component 180 includes an outer journal surface 282 while the bearing component 270 includes an inner bearing surface 272 and an outer surface 274 that includes various features such as a first annular groove 275-1 for seating a first resilient O-ring 295-1, a second annular groove 275-2 for seating a second resilient O-ring 295-2 and an annular channel 277 for seating a retaining ring 297. Referring again to FIG. 1, a retaining ring may act to retain the bearing component 140 of the radial bearing assembly 106 in an axial location with respect to another component such as the inlet component 105, the diffuser 120-2, etc. In such an example, the inlet component 105 and the diffuser component 120-2 may each include a matching channel to at least partially seat such a retaining ring for axially locating and retaining a bearing component of the radial bearing assembly 106-1 and a bearing component of the radial bearing assembly 106-2, respectively. As to the resilient O-rings 295-1 and 295-2, these may provide for vibration damping and shock absorbance to help protect the bearing component 270 (e.g., or the bearing component 140 of the assembly 106, the bearing component 170 of the assembly 156, etc.).

As described in various examples, a radial bearing assembly, such as the radial bearing assembly 214, provides a bearing interface. In the examples of FIG. 2, a bearing interface is formed by the outer journal surface 282 of the journal component 280 and the inner bearing surface 272 of the bearing component 270. As mentioned, in an assembly, some small radial clearance exists between the surfaces 282 and 272 to allow for rotation of the journal surface 282 with respect to the bearing surface 272. Further, as mentioned, a pressure differential across the axial length of a clearance (e.g., a bearing interface) may cause fluid to move or otherwise fill the clearance (e.g., noting that capillary forces may also cause wicking of fluid).

As shown in FIG. 2, at the first time ($t_0$), the bearing interface is uniform, for example, defined in accordance with manufacturer specifications. However, at the second, later time ($t_n$), particles (e.g., solids) that have entered the clearance and have, in combination with differential rotation of the journal component 280 with respect to the bearing component 270 (e.g., journal component 280 spinning faster than the bearing component 270), caused abrasion of one or more of the journal surface 282 and the bearing surface 272. As depicted in the approximate two-dimensional cross-sectional view at the later time ($t_n$), abrasive forces may result in wear that increases the clearance (see, e.g., $\Delta r_s$), whether over the entire axial length $\Delta z$, over portions of the axial length or both. Such wear can increase running clearance and allow a rotating shaft and impeller assembly to wobble, nutate or wobble and nutate during operation. Such wear can increase pump leakage losses, which may detrimentally impact pump performance.

FIG. 2 also shows a block diagram of a method 230 and an accompanying, approximate plot 240 of an increase in clearance with respect to time due to abrasive wear. As to the method 230, in a provision block 232, a pump is provided that includes at least one radial bearing assembly; in a drive block 234, the pump is driven to rotate a shaft supported by the at least one radial bearing assembly; and, in a wear block 236, an interface defined by a journal component and a bearing component of a radial bearing assembly is worn by abrasive action caused at least in part by particles that have entered a clearance defined by and between these two components of the radial bearing assembly.

As to the plot 240, it intends to approximate trends found in evidence from slurry pumping trials of pumps that include a radial bearing assembly with a ceramic-style bearing component that demonstrates an exponentially decreasing wear rate where much of the abrasive wear of the bearing interface (e.g., interface defined by a journal surface and a bearing surface) occurs relatively early in a pump's running time (e.g., for trials running at a rotational speed of about 3,500 rpm). While ceramic-style bearing components are mentioned, centrifugal pumps designed for slurry service may include ceramic, carbide or other material for bearing assembly components at one or more locations along the length of the rotating assembly.

As an example, rapid initial bearing interface wear may stem from an initial radial clearance being less than a sand grain size for at least some of the grains passing through the interface, being less than a size of contacting sand grains (e.g., stacked, piled up, etc.), or a combination of both. Given such grain characteristics and/or grain-related phenomena, rotation together with overall axial progression of the grains results in somewhat rapid abrasive formation of one or more wear paths (e.g., from an entrance end of a clearance to an exit end of a clearance). As such a path forms, or paths form, (e.g., optionally with an overall abrasion-driven increase in clearance), grains pass more readily without exerting sufficient force to be abrasive to component surfaces. As an example, fewer grains may become trapped and, for grains that do become trapped, these grains may cause a relatively shorter wear path (e.g., due to nutation of the rotating assembly). Grains that become trapped may migrate toward an existing path having sufficient dimension for passage and exit. From slurry trials, data indicate that abrasive wear rate tends to stabilize once a path has increased to several sand grain diameters.

As to grain characteristics, a grain size refers to crosswise dimension (e.g., a diameter) of an individual grain. A single grain may include crystalline material (e.g., quartz) and may be composed of several crystals. In general, granular material that may flow into a pump can range from very small colloidal particles, through clay, silt, and sand. Standard tables classify grains as having sizes from 0.25 to 0.5 mm (0.010-0.020 in) as medium sand, sizes from 125 to 250 µm (0.0049-0.010 in) as fine sand, sizes from 62.5 to 125 µm (0.0025-0.0049 in) as very fine sand, and sizes from about 3.9 to 62.5 µm (0.00015-0.0025 in) as silt.

As a material, "sand" refers to naturally occurring granular material composed of finely divided rock and mineral particles. The composition of sand can be variable, depending on the local rock sources and conditions, but a common constituent of sand in inland continental settings and non-tropical coastal settings may be silica (silicon dioxide, or $SiO_2$), for example, in the form of quartz. Silicon dioxide has a density of about 2.6 $g/cm^3$ and silica sand has a Mohs scale hardness of 7. As to hardness of other materials, steel (non-hardened) has a Mohs scale hardness of about 4 to 4.5, hardened steel has a Mohs scale hardness of about 7.5 to 8, cubic zirconia has a Mohs scale hardness of about 8, and silicon carbide (carborundum), tungsten carbide, and titanium carbide have Mohs scale hardnesses of about 9 to 9.5. The Knoop scale is another hardness scale where, for example, a Knoop scale hardness of about 500 corresponds to a Mohs scale hardness of about 4.5. For electric submersible pumps (ESPs), ceramics such as zirconia, tungsten carbide and silicon carbide may be used (e.g., for one or more components); noting that such ceramics may exhibit some brittleness.

As to ESPs, such pumps may be deployed for any of a variety of pumping purposes. For example, where a substance does not readily flow responsive to existing natural forces, an ESP may be implemented to artificially lift the substance. Commercially available ESPs (such as the REDA™ ESPs marketed by Schlumberger Limited, Houston, Tex.) may find use in applications that call for, for example, pump rates in excess of 4,000 barrels per day and lift of 12,000 feet or more. As an example, an ESP may be specified as having a best efficiency point (BEP) of about 77% for a flow of about 7,900 barrels per day, a head of about 49 feet and a horsepower of about 3.69 for a fluid specific gravity of 1.0 (e.g., REDA™ 538 Series, 1 stage at 3,500 RPM at 60 Hz). An ESP may be specified with a lift per stage such that a number of stages may be selected for an application to meet lift requirements.

Figure 3:
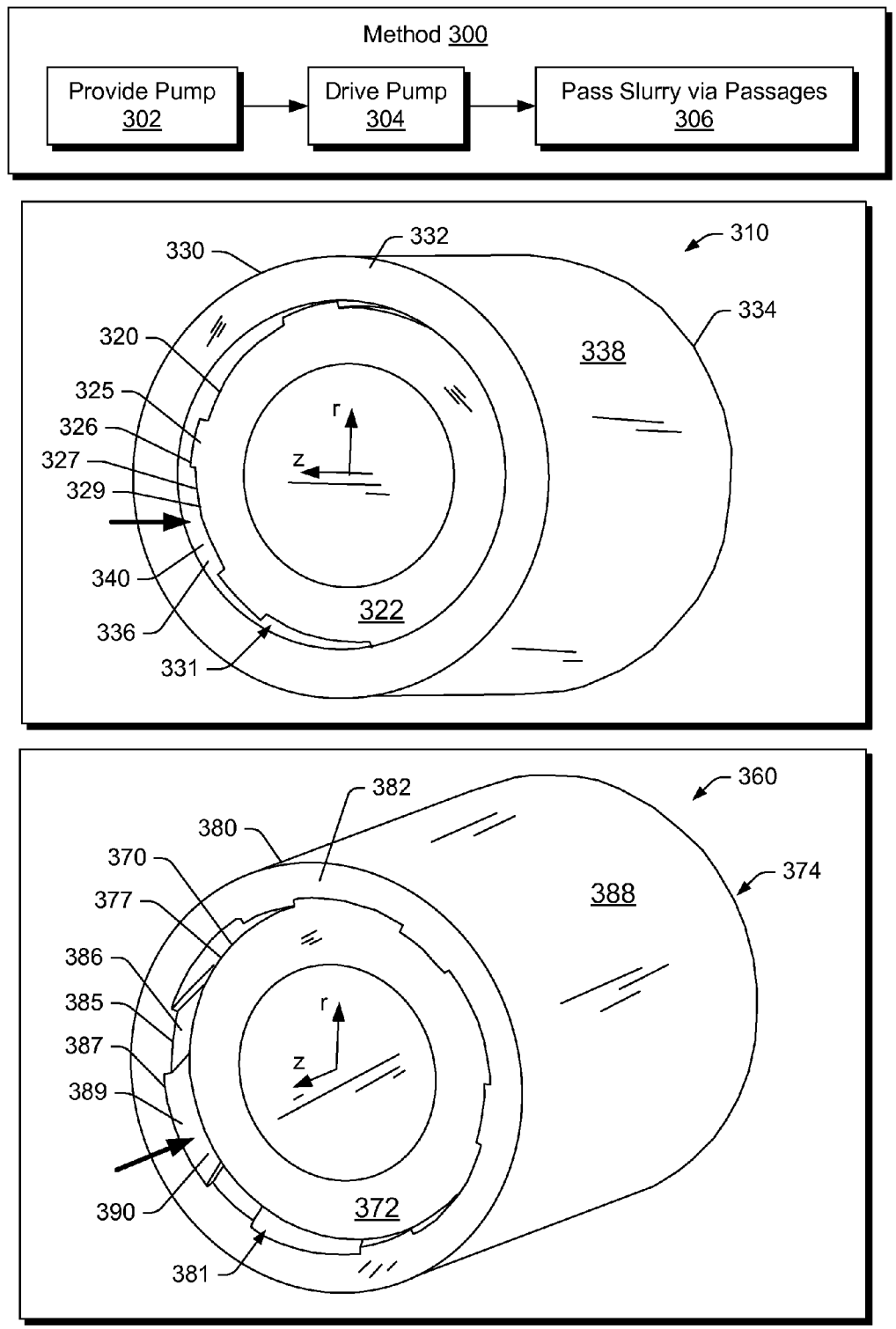
FIG. 3 illustrates an example of a method and examples of radial bearing assemblies.

FIG. 3 shows a block diagram of an example of a method 300 along with two perspective views of examples of radial bearing assemblies 310 and 360 suitable for use in a multistage centrifugal pump. As to the method 300, in a provision block 302, a pump is provided that includes at least one radial bearing assembly having at least one particle passage; in a drive block 304, the pump is driven to rotate a shaft supported by the at least one radial bearing assembly; and, in a passage block 306, the at least one particle passage (e.g., defined by a journal component and a bearing component of a radial bearing assembly) allows for passage of at least some particles in a fluid. Such an arrangement can reduce abrasive action caused at least in part by particles that have entered a clearance defined by and between components of a radial bearing assembly.

As to the example radial bearing assembly 310, it includes a journal component 320 and a bearing component 330, which may be referred to as first and second components or second and first components. As shown in the perspective view of FIG. 3, the journal component 320 includes an end surface 322 and radially extending portions 325 arranged at various azimuthal angles about a longitudinal axis (z-axis) of the journal component 320. In the example of FIG. 3, the radially extending portions 325 are defined by undercuts 327 (e.g., recessed portions) such that the outer surface of the journal component 320 includes journal surfaces 326 (e.g., raised surfaces) and undercut surfaces 329 (e.g., recessed surfaces). In the example of FIG. 3, the journal surfaces 326 are discrete and separated by the undercuts 327. The journal surfaces 326 are disposed at a radial distance from the longitudinal axis of the journal component 320 that exceeds a radial distance for the undercut surfaces 329.

As to the bearing component 330, it includes opposing ends 332 and 334, a bore 331 having a radial surface 336 (e.g., a bearing surface), and an outer surface 338. As shown in the example of FIG. 3, the bore 331, the radial surface 336 and the outer surface 338 extend axially between the opposing ends 332 and 334 of the bearing component 330.

As shown in FIG. 3, for the radial bearing assembly 310, the journal component 320 is received by the bore 331 of the bearing component 330 where, upon concentric alignment of the longitudinal axis of the journal component 320 and a longitudinal axis of the bearing component 330 (e.g., along the z-axis), a series of particle passages 340 are formed. In the example of FIG. 3, the particle passages 340 are defined by the undercuts 327 and the radial surface 336 (e.g., bearing surface) of the bearing component 330. More specifically, each of the particle passages 340 exists between one of the undercut surfaces 329 of the journal component 320 and the radial surface 336 (e.g., bearing surface) of the bearing component. To reduce channeling of fluid and associated losses, a particle passage may be axially deviant in that at least a portion of the passage deviates from an axial path across the length of a component.

As to the example radial bearing assembly 360, it includes a journal component 370 and a bearing component 380, which may be referred to as first and second components or second and first components. As shown in the perspective view of FIG. 3, the bearing component 380 includes a bore 381, an end surface 382 and radially extending portions 385 arranged at various azimuthal angles about a longitudinal axis (z-axis) of the bearing component 380. In the example of FIG. 3, the radially extending portions 385 are defined by undercuts 387 (e.g., recessed portions) such that the outer surface of the bearing component 380 includes bearing surfaces 386 (e.g., raised surfaces) and undercut surfaces 389 (e.g., recessed surfaces). In the example of FIG. 3, the bearing surfaces 386 are discrete and separated by the undercuts 387. The bearing surfaces 386 are disposed at a radial distance from the longitudinal axis of the bearing component 380 that is less than a radial distance for the undercut surfaces 389. As shown in FIG. 3, the bearing surfaces 386 and the undercut surfaces 389 are disposed within the bore 381 of the bearing component 380.

As to the journal component 370, it includes opposing ends 372 and 374 (not shown, see arrow) and a radial surface 377 (e.g., a journal surface). In the example of FIG. 3, the radial surface 377 extends axially between the opposing ends 372 and 374 of the journal component 370.

As shown in FIG. 3, for the radial bearing assembly 360, the journal component 370 is received by the bore 381 of the bearing component 380 where concentric alignment of a longitudinal axis of the journal component 370 and the longitudinal axis of the bearing component 380 (e.g., along the z-axis), forms particle passages 390. In the example of FIG. 3, the particle passages 390 are defined by the undercuts 387 and the radial surface 377 of the journal component 370. More specifically, each of the particle passages 390 exists between one of the undercut surfaces 389 of the bearing component 380 and the radial surface 377 (e.g., journal surface) of the journal component.

In the example of FIG. 3, the outer surface 338 or the outer surface 388 may include one or more of the features of, for example, the bearing component 270 of FIG. 2 (e.g., one or more grooves, channels, etc.).

For the radial bearing assemblies 310 and 360, "contact" or "interface" area is limited to provide passages that can permit passage of particles (e.g., grains). For the radial bearing assembly 310, the radial surface 336 can be a full diameter bearing surface while, for the radial bearing assembly 360, the radial surface 377 can be a full diameter journal surface. In each of these assemblies 310 and 360, such full diameter surfaces can provide sufficient radial support while the particle passages 340 and 390 provide for particle passage. For the examples of FIG. 3, as well as various other examples, a passage that deviates from axial can avoid seating of one component with respect to the other component, for example, in a channel or groove. For example, where a pump is disposed at an angle with respect to gravity, during periods of non-operation, settling of one component may occur with respect to another component. In such an example, where an axial channel exists, the components may become seated with respect to the channel. Axial deviation of a particle passage (e.g., via helical or other arrangement of features) can act to avoid such stationary seating of components.

As explained with respect to various examples, particle passages can reduce entrapment of grains in a rotating interface and reduce abrasive wear caused by one or more grains that enter the interface. As grains tend to have a tangential path through a bearing interface (e.g., combined rotational velocity and flow through velocity), a grain that does become trapped will tend to be wiped into an adjacent passage and thereby have a shortened wear path. Depth of an undercut may be selected and provided to allow free passage of individual sand grains less than a particular size while also maintaining some limits on potential for fluid leakage losses. Based on particular trials that were performed for pumping a slurry, depth of an undercut, and hence a particle passage, may be selected and provided as a multiple of a grain size. For example, for the slurry pumped during the trials, depth of an undercut may be a multiple of about two to about four grain sizes. As to fluid leakage losses, one or more particle passages, as defined by one or more undercuts, may be axially deviant. Axial deviation of a passage may act to reduce channeling of fluid and potential for fluid leakage losses.

As an example, a radial bearing assembly for a centrifugal pump can include a first component that has a longitudinal axis and that includes discrete radial surfaces separated by undercuts, the discrete radial surfaces disposed at a radial distance from the longitudinal axis; a second component that has a longitudinal axis and that includes a radial surface disposed at a radial distance from the longitudinal axis; and, formed by concentric alignment of the longitudinal axis of the first component and the longitudinal axis of the second component, a journal and bearing clearance, defined by the difference between the radial distance of the radial surfaces of the first component and the radial distance of the radial surface of the second component, and axially deviant particle passages defined by the undercuts and the radial surface of the second component. In such an example, the first component may be a sleeve where the discrete radial surfaces are journal surfaces or the first component may be a bearing where the discrete radial surfaces are bearing surfaces and the second component may be a bearing where the radial surface is a bearing surface or the second component may be a sleeve where the radial surface is a journal surface, respectively.

With respect to undercuts of a component of a radial bearing assembly, as an example, such undercuts may be helical undercuts. With respect to discrete radial surfaces of a component of a radial bearing assembly, as an example, such radial surfaces may include helically arranged surfaces. As to a helical undercuts or helically arranged surfaces, these may be right-handed, left-handed and optionally both right-handed and left-handed. As to right-handed and left-handed, consider a component that includes a set of right-handed undercuts and a set of left-handed undercuts. In such an example, the undercuts may define discrete, diamond-shaped radial surfaces, which would be helically arranged (e.g., according to a right-handed helix and a left-handed helix). Characteristics of a helix can include pitch, which is the length of one complete turn as measured parallel to a longitudinal axis of the helix. As an example, a helical undercut of a component may include a pitch that exceeds the axial length of the component (i.e., the helical undercut is less than a complete turn). As an example, a discrete radial surface of a component may be helically arranged and defined with respect a pitch that exceeds the axial length of the component. In a cylindrical coordinate system (right-handed), a helix may be parameterized by: $r(x)=1$, $\Theta(x)=x$, and $z(x)=x$.

As an example, an electric submersible pump can include a rotatable shaft; an electric motor for rotating the rotatable shaft; and at least one radial bearing assembly where each radial bearing assembly includes a first component that includes a longitudinal axis and discrete radial surfaces separated by undercuts, the discrete radial surfaces disposed at a radial distance from the longitudinal axis; a second component that includes a longitudinal axis and a radial surface disposed at a radial distance from the longitudinal axis; and, formed by concentric alignment of the longitudinal axis of the first component and the longitudinal axis of the second component, a journal and bearing clearance, defined by the difference between the radial distance of the radial surfaces of the first component and the radial distance of the radial surface of the second component, and axially deviant particle passages defined by the undercuts and the radial surface of the second component.

As an example, a method can include providing a centrifugal pump that includes at least one radial bearing assembly where each radial bearing assembly includes a first component includes has a longitudinal axis and discrete radial surfaces separated by undercuts, the discrete radial surfaces disposed at a radial distance from the longitudinal axis; a second component that includes a longitudinal axis and a radial surface disposed at a radial distance from the longitudinal axis; and, formed by concentric alignment of the longitudinal axis of the first component and the longitudinal axis of the second component, a journal and bearing clearance, defined by the difference between the radial distance of the radial surfaces of the first component and the radial distance of the radial surface of the second component, and axially deviant particle passages defined by the undercuts and the radial surface of the second component; driving the centrifugal pump to pump a slurry; and passing the slurry through the particle passages.

Figure 4:
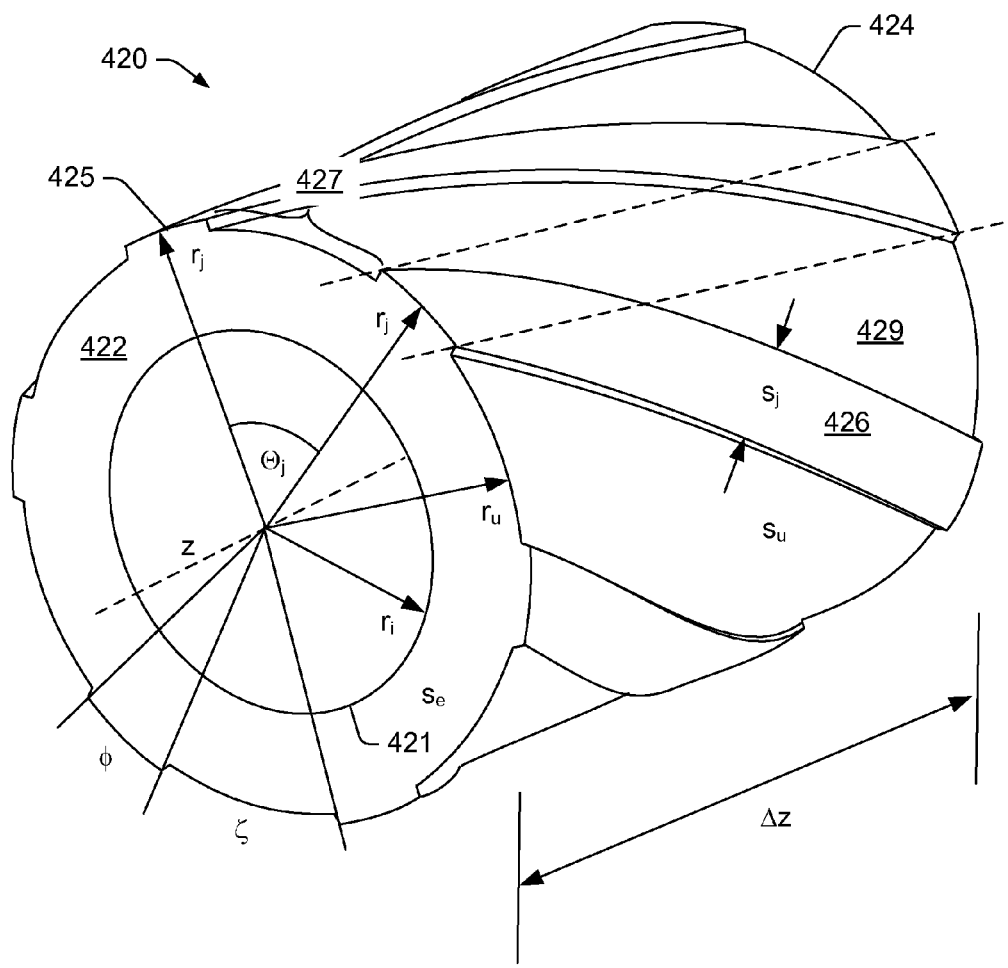
FIG. 4 illustrates an example of a journal component.

FIG. 4 shows a perspective view of an example of a journal component 420 suitable for use in a radial bearing assembly. In the example of FIG. 4, the journal component 420 includes opposing end surfaces 422 and 424, radially extending portions 425 and undercuts 427. The journal component 420 may include a bore 421, for example, where the journal component 420 is a sleeve to be fit to a shaft or other rotatable component. In FIG. 4, a cylindrical coordinate system is shown with axial coordinate z, radial coordinate r, and azimuthal coordinate Θ. At the end surface 422, the radially extending portions 425 include journal surfaces 426 disposed at a radial distance $r_j$ which are disposed at azimuthal intervals of $Θ_j$. The azimuthal arc length of each of the journal surfaces 426 may be defined by an angle, or respective angles, φ; noting that arc length of the undercuts 427 may be defined by an azimuthal angle ζ, or respective angles, as well. Further, over an axial length Δz of the journal component 420, each of the journal surfaces 426 progresses in a helical manner. In the example of FIG. 4, the azimuthal progression of each helical journal surface 426 is the approximately the same as the azimuthal interval $Θ_j$; noting that these azimuthal angles may differ. As to the undercuts 427, in the example of FIG. 4, these traverse the entire axial length Δz of the journal component 420 and similarly progress in a helical manner, which may be characterized by an azimuthal angle.

As shown in FIG. 4, the undercuts 427 have respective undercut surfaces 429, disposed at a radial distance $r_u$ as measured from the longitudinal axis (z-axis) of the journal component 420. The depth of the axially deviant particle passages formed by such a journal component may be estimated as the difference between the journal surface radius $r_j$ and the undercut surface radius $r_u$. When provided as part of a radial bearing assembly, the actual particle passage depth will be initially provided by this estimate, at a minimum, and a larger depth determined by bearing interface clearance and axial alignment or misalignment. Where a journal component is maximally, axially misaligned in a bore of a bearing component (e.g., one side touching the bore), the maximum particle passage depth may be estimated as twice the interface clearance plus the difference between the journal surface radius and the undercut surface radius.

In the example of FIG. 4, the journal component 420 includes six radially extending portions 425 and six undercuts 427. In such an example, the radially extending portions 425 may be formed by milling out material to form the undercuts 427. In the example of FIG. 4, each of the six radially extending portions 425 provides for a corresponding one of the journal surfaces 426 where each of the journal surfaces 426 may be characterized by a pitch where the pitch is less than the axial length Δz of the journal component 420 (i.e., a journal surface makes less than a single turn). In the example of FIG. 4, each of the six undercuts 427 provides for a corresponding one of the undercut surfaces 429 where each of the undercut surfaces 429 may be characterized by a pitch where the pitch is less than the axial length Δz of the journal component 420 (i.e., an undercut surface makes less than a single turn).

In the example of FIG. 4, the arc angle φ may be less than the arc angle ζ. In such an example, the total surface of the journal surfaces 426 is less than the total surface of the undercut surfaces 429. As an example, an undercut surface area (e.g., associated with undercuts 427) may exceed the sum of surface areas of the journal surfaces 426. As an example, an undercut surface area associated with undercuts may be at least about 50% of the sum of surface areas for discrete radial surfaces (e.g., radial bearing assembly interface surfaces). As another example, an undercut surface area associated with undercuts may be at least about 25% of the sum of surface areas for discrete radial surfaces (e.g., radial bearing assembly interface surfaces). In such examples, aforementioned angles may optionally characterize surface area ratios (e.g., see arc angles φ and ζ, which when multiplied by a number of discrete radial surfaces and a number of undercuts, respectively, may collectively sum to 360 degrees).

As an example, a component of a radial bearing assembly can include one or more undercut surfaces. As an example, an undercut surface area associated with undercuts may exceed a sum of surface areas for discrete radial surfaces. As an example, a particle passage may include a depth that is at least double a journal and bearing clearance of a radial bearing assembly.

Figure 5:
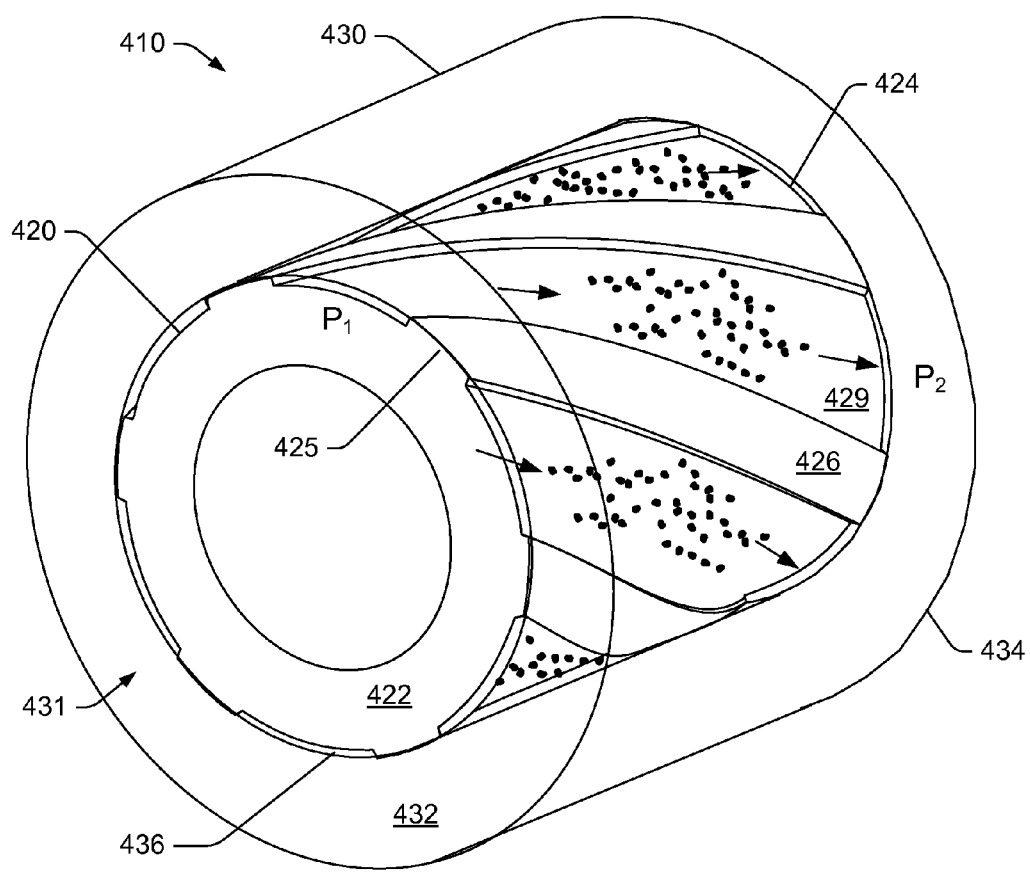
FIG. 5 illustrates an example of a radial bearing assembly that includes the journal component of FIG. 4.
Figure 5:
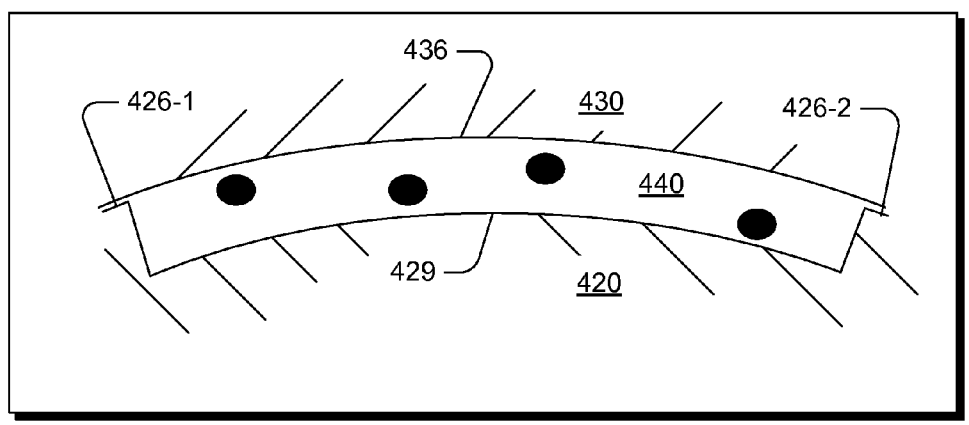

FIG. 5 shows a perspective view of a radial bearing assembly 410 that includes the journal component 420 of FIG. 4 and a bearing component 430. The bearing component 430 includes opposing ends 432 and 434, a bore 431 and a bearing surface 436. In the example of FIG. 5, particles (e.g., grains) are shown in passages 440, which are defined by the journal component 420 and the bearing component 430. In the example of FIG. 5, clearances exist between the journal surfaces 426-1 and 426-2 of the journal component 420 and the bearing surface 436 of the bearing component 430. Where $P_1$ is greater than $P_2$, the particles may be expected to flow in the axially deviant particle passages 440 in a direction indicated by various arrows (e.g., even without rotation, the particle flow paths deviate from a straight axial traverse of radial bearing assembly). In such an arrangement, abrasive wear of one or more of the components 420 and 430 may be reduced.

Figure 6:
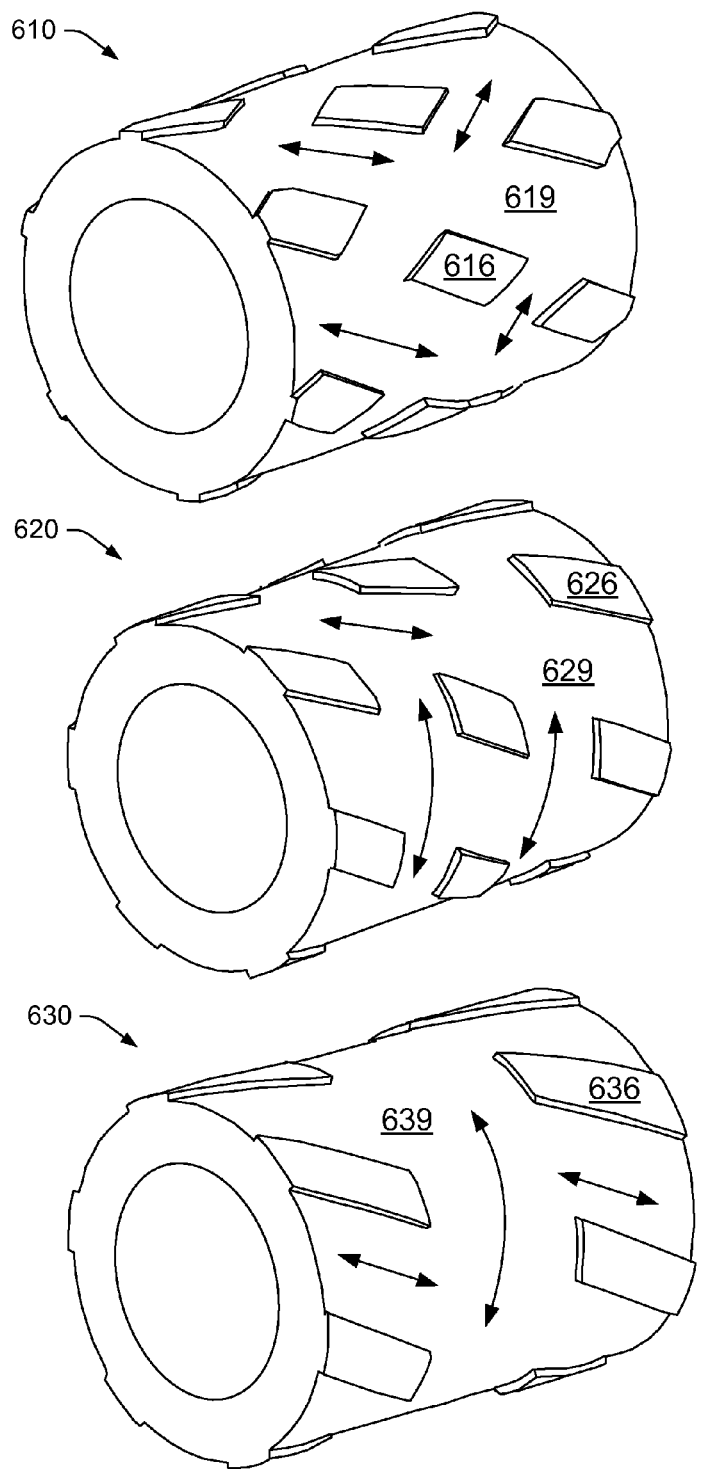
FIG. 6 illustrates examples of surfaces and undercuts of a component.

FIG. 6 shows some examples of journal components 610, 620 and 630. For the journal component 610, journal surfaces 616 exist as discrete surfaces surrounded at least in part by an undercut surface 619, which may be contiguous. Arrows are shown to indicate possible directions for particle flow in axially deviant particle passages that may be defined, in part, by the journal component 610. In this example, the discrete surfaces 616 are helically arranged and may be defined, in part, by one or more parameters of a helix or helixes. For example, milling right-handed and left-handed helical undercuts into a blank journal component may form the undercut surface 619, leaving the discrete surfaces 616 as "islands".

For the journal component 620, journal surfaces 626 exist as discrete surfaces surrounded at least in part by an undercut surface 629, which may be contiguous. Arrows are shown to indicate possible directions for particle flow in axially deviant particle passages that may be defined, in part, by the journal component 620. In this example, the discrete surfaces 626 are helically arranged and may be defined, in part, by one or more parameters of a helix or helixes. For example, milling helical undercuts into a blank journal component may form undercut surfaces, leaving journal surfaces running from end to end. Further, by milling two bands (e.g., each at an axial location and having an axial width), the contiguous undercut surface 629 and the journal surfaces 626 may be formed.

For the journal component 630, journal surfaces 636 exist as discrete surfaces surrounded at least in part by an undercut surface 639, which may be contiguous. Arrows are shown to indicate possible directions for particle flow in axially deviant particle passages that may be defined, in part, by the journal component 630. In this example, the discrete surfaces 636 are helically arranged and may be defined, in part, by one or more parameters of a helix or helixes. For example, milling helical undercuts into a blank journal component may form undercut surfaces, leaving journal surfaces running from end to end. Further, by milling a single band (e.g., at an axial location and with an axial width), the contiguous undercut surface 639 and the journal surfaces 636 may be formed.

Figure 7:
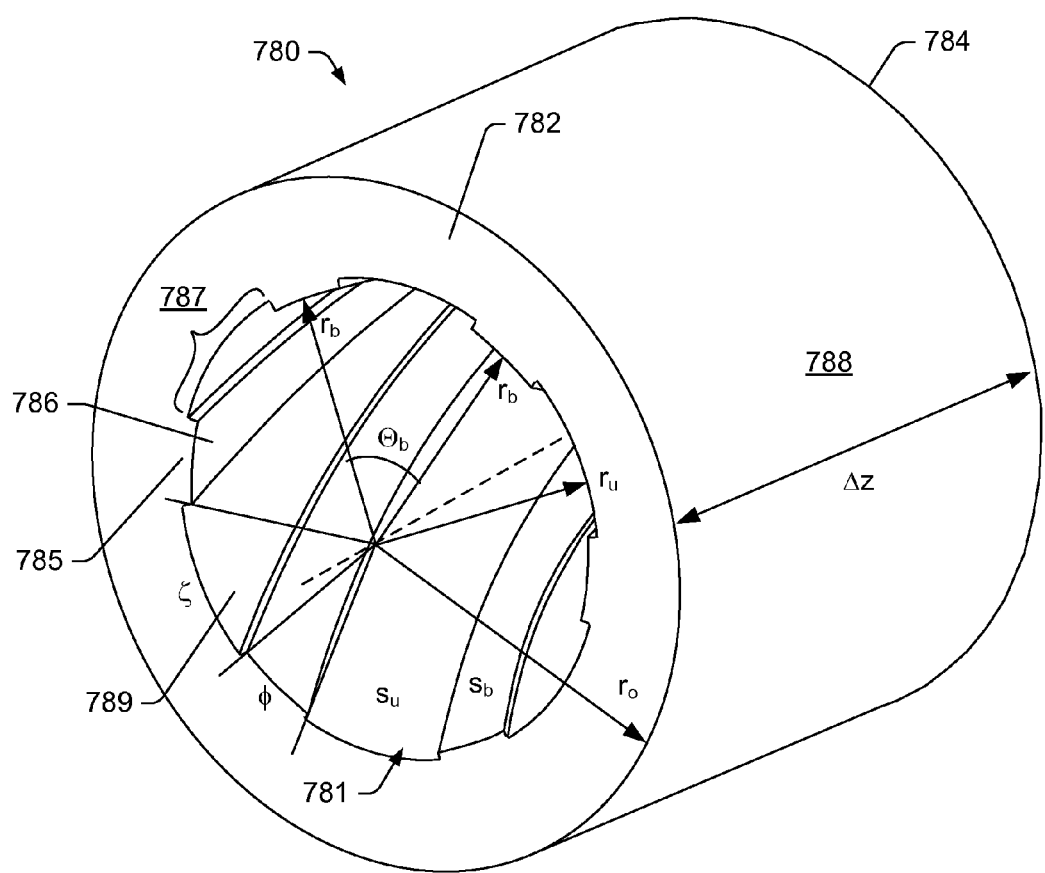
FIG. 7 illustrates an example of a bearing component.

FIG. 7 shows an example of a bearing component 780. As shown in FIG. 7, the bearing component 780 includes opposing ends 782 and 784, a bore 781, radially extending portions 785, undercuts 787, and an outer surface 788. Within the bore 781, the radially extending portions 785 include bearing surfaces 786 while the undercuts 787 include undercut surfaces 789. In a cylindrical coordinate system, the bearing surfaces 786 are disposed at a radial distance $r_b$ at azimuthal intervals $\Theta_b$ and span an azimuthal arc angle $\phi$ while the undercut surfaces 789 are disposed at a radial distance $r_u$ and span an azimuthal arc angle $\zeta$. Further, over an axial length $\Delta z$ of the bearing component 780, each of the bearing surfaces 786 progresses in a helical manner. In the example of FIG. 7, the azimuthal progression of each helical journal surface 786 is approximately the same as the azimuthal interval $\Theta_b$; noting that these azimuthal angles may differ. As to the undercuts 787 and their undercut surfaces 789, in the example of FIG. 7, these traverse the entire axial length $\Delta z$ of the bearing component 780 and similarly progress in a helical manner, which may be characterized by an azimuthal angle.

In the example of FIG. 7, the outer surface 788 is shown as being disposed at a radial distance $r_o$. The outer surface 788 may include one or more of the features of, for example, the bearing component 270 of FIG. 2 (e.g., one or more grooves, channels, etc.).

In the example of FIG. 7, the bearing component 780 includes six radially extending portions 785 and six undercuts 787. In such an example, the radially extending portions 785 may be formed by milling out material to form the undercuts 787.

The depth of particle passages formed by such a bearing component may be estimated as the difference between the bearing surface radius $r_b$ and the undercut surface radius $r_u$. When provided as part of a radial bearing assembly, the actual particle passage depth will be initially provided by this estimate, at a minimum, and a larger depth determined by bearing interface clearance and axial alignment or misalignment. Where a journal component is maximally, axially misaligned in a bore of a bearing component (e.g., one side touching the bore), the maximum particle passage depth may be estimated as twice the interface clearance plus the difference between the bearing surface radius and the undercut surface radius.

While FIG. 7 shows a particular arrangement of features, one or more of the features of the examples 610, 620 and 630 of FIG. 6, or other arrangement of features, may be provided with respect to a bearing component. For example, the bearing component 780 of FIG. 7 may include features reciprocal to one or more features of the examples 610, 620 or 630 of FIG. 6.

Figure 8:
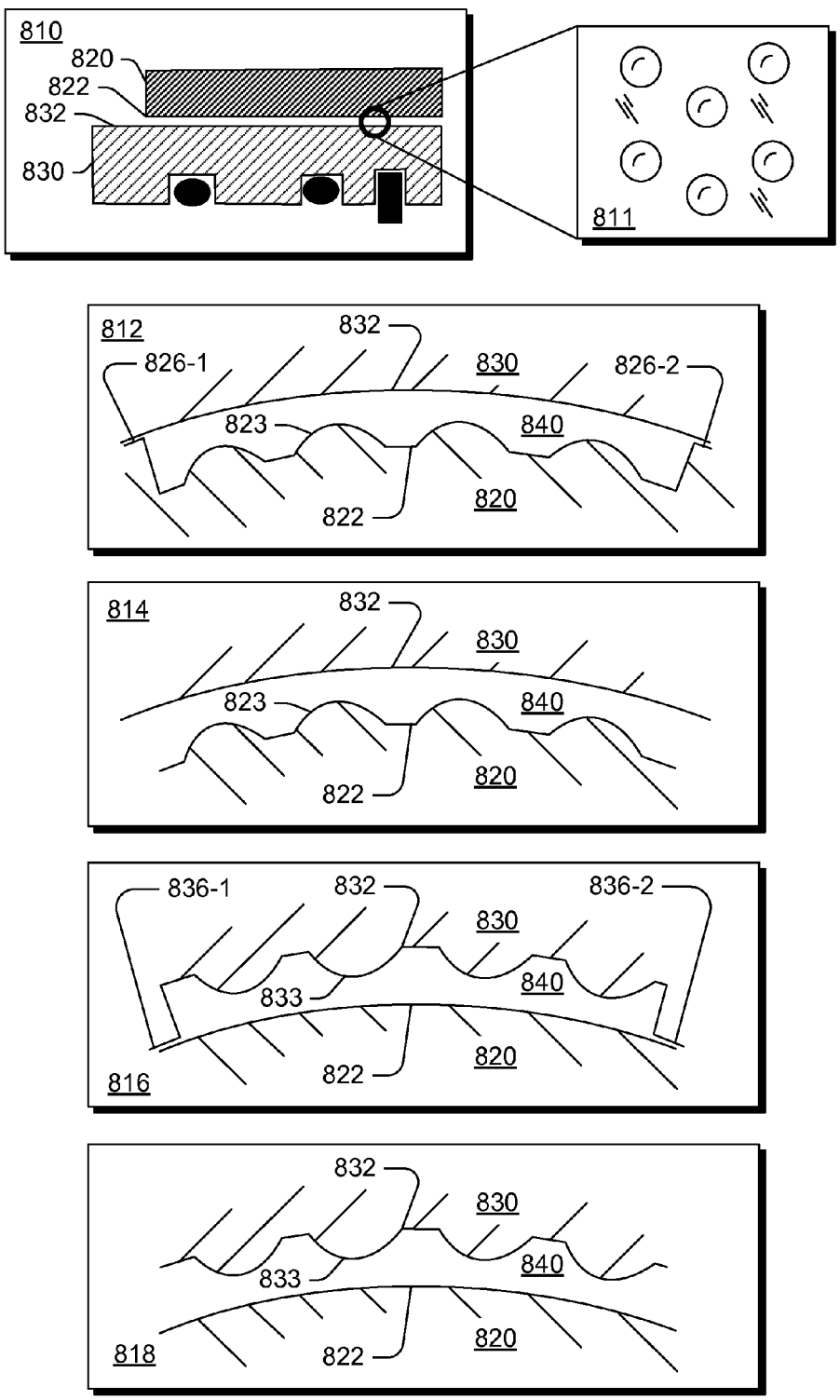
FIG. 8 illustrates examples of surfaces with domes.

FIG. 8 shows an example of an assembly 810 that includes an interface defined by a surface 822 of a component 820 and a surface 832 of a component 830. As indicated in an enlarged view 811, at least one of the surfaces 822 and 832 includes domes (e.g., convex domes). Such domes may provide a guiding effect for passage of abrasive particles, which, in turn, may reduce abrasive wear of one or more components that define an interface. In the examples 812, 814, 816 and 818 of FIG. 8, one or more of the components 820 and 830 may include embossed surfaces, for example, where raised features include convex domes. In the examples 812, 814, 816 and 818, features may form one or more axially deviant particle passages.

In the example 812, the surface 822 includes an undercut surface disposed between two journal surfaces 826-1 and 826-2. As shown, the undercut surface includes domes 823. In combination with the surface 832 of the component 830, a particle passage 840 is formed. During operation, as particles pass via the passage 840, the domes 823 may reduce abrasive wear of the component 820.

In the example 814, the surface 822 includes domes 823. In combination with the surface 832 of the component 830, a particle passage 840 is formed. During operation, as particles pass via the passage 840, the domes 823 may reduce abrasive wear of the component 820.

In the example 816, the surface 832 includes an undercut surface disposed between two bearing surfaces 836-1 and 836-2. As shown, the undercut surface includes domes 833. In combination with the surface 822 of the component 820, a particle passage 840 is formed. During operation, as particles pass via the passage 840, the domes 833 may reduce abrasive wear of the component 830.

In the example 818, the surface 832 includes domes 833. In combination with the surface 822 of the component 820, a particle passage 840 is formed. During operation, as particles pass via the passage 840, the domes 833 may reduce abrasive wear of the component 830.

As to examples of manufacture, domes may be formed via a casting process, a shot peening process, a knurling process or other process. As to casting, a mold may include dimples such that ceramic material poured into the mold will include domes. As to a shot peening process, shot may be directed to a surface of a component to thereby erode portions of the surface to leave islands. Such islands may be dome-shaped (e.g., domed or raised portions that extend upward from valleys). As to knurling, such a process may include rotating a component on a lathe, for example, to impart a diamond-shaped pattern or other shaped pattern (e.g., via crisscross cutting that undercuts the component to leave raised features). As another example, knurling may include rolling of a component with respect to a cutting tool or other tool for forming dome-shaped islands. While some types of processes are mentioned, one or more other types of processes may optionally be used (e.g., laser ablation, cutting, etc.).

In various examples, a dome may be considered as being a raised portion of a component surrounded at least in part by a valley or valleys, which may be considered as being undercut portions of the component (e.g., a dome may be an island). Domes may be discrete radial surfaces separated by such undercuts, for example, where each of the discrete radial surfaces is disposed at a radial distance (e.g., as measured from a longitudinal axis of a component).

As an example, a radial bearing assembly for a centrifugal pump can include a first component that includes a longitudinal axis and discrete radial surfaces separated by undercuts, each of the discrete radial surfaces disposed at a radial distance from the longitudinal axis; a second component that includes a longitudinal axis and a radial surface disposed at a radial distance from the longitudinal axis; and, formed by concentric alignment of the longitudinal axis of the first component and the longitudinal axis of the second component, journal and bearing clearances, each journal and bearing clearance defined by the difference between the radial distance of a respective one of the radial surfaces of the first component and the radial distance of the radial surface of the second component, and axially deviant particle passages defined at least in part by the undercuts and the radial surface of the second component. In such an assembly, the discrete radial surfaces separated by undercuts may include domed surfaces. Such domed may be formed, for example, via a process such as knurling, casting, peening, etc.

Figure 9:
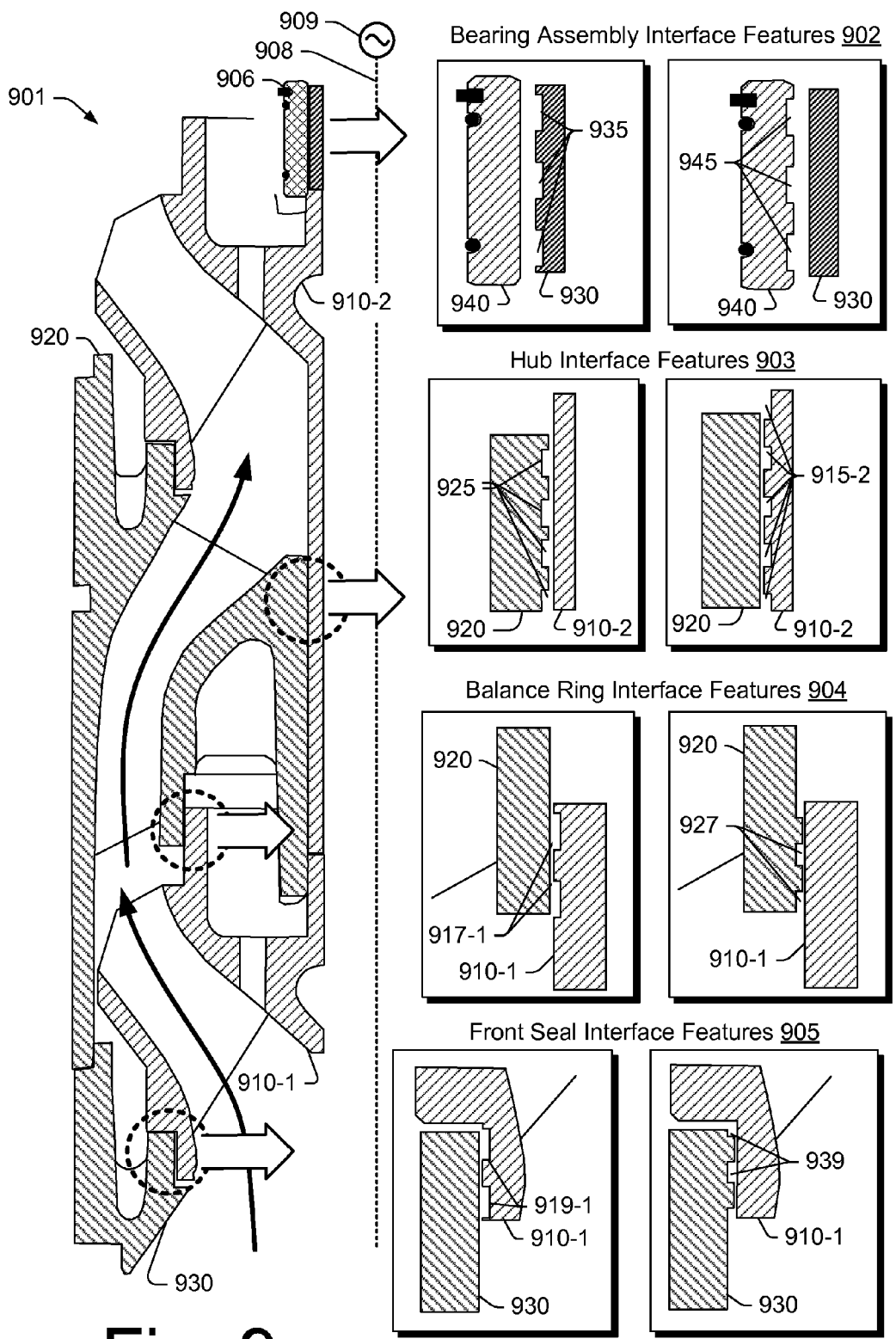
FIG. 9 illustrates examples of radial bearing assemblies.

FIG. 9 shows a cross-sectional view of a portion of an example of a multistage electric submersible pump 901 (e.g., a centrifugal pump) that includes at least one bearing assembly 906, a shaft 908, an electric motor 909, a seating component 930, a first impeller 910-1, a diffuser 920 and a second impeller 910-2. Aside from a clearance or clearances of the bearing assembly 906, dashed circles highlight some interfaces where a clearance or clearances exist between the impeller 910-1 or the impeller 910-2 and another component. In various enlarged views, various examples of interface features are shown including bearing assembly interface features 902, hub interface features 903, balance ring interface features 904 and front seal interface features 905. In these examples, features may form one or more axially deviant particle passages.

With respect to the bearing assembly interface features 902, an interface is defined by a journal component 930 and a bearing component 940 where, in one example, the journal component 930 includes a plurality of features 935, which may be one or more undercuts, valleys adjacent one or more domes, etc. In another example, the bearing component 940 includes a plurality of features 945, which may be one or more undercuts, valleys adjacent one or more domes, etc. In such examples, features can, at least in part, form one or more particle passages (e.g., where each particle passage includes an inlet and an outlet), which may be axially deviant.

With respect to the hub interface features 903, an interface is defined by an impeller component 910-2 and a diffuser component 920 where, in one example, the diffuser component 920 includes a plurality of features 925, which may be one or more undercuts, valleys adjacent one or more domes, etc. In another example, the impeller component 910-2 includes a plurality of features 915-2, which may be one or more undercuts, valleys adjacent one or more domes, etc. In such examples, features can, at least in part, form one or more particle passages (e.g., where each particle passage includes an inlet and an outlet), which may be axially deviant.

With respect to the balance ring interface features 904, an interface is defined by an impeller component 910-1 and a diffuser component 920 where, in one example, the impeller component 910-1 includes a plurality of features 917-1, which may be one or more undercuts, valleys adjacent one or more domes, etc. In another example, the diffuser component 920 includes a plurality of features 927, which may be one or more undercuts, valleys adjacent one or more domes, etc. In such examples, features can, at least in part, form one or more particle passages (e.g., where each particle passage includes an inlet and an outlet), which may be axially deviant.

With respect to the front seal interface features 905, an interface is defined by an impeller component 910-1 and a seating component 930 where, in one example, the impeller component 910-1 includes a plurality of features 919-1, which may be one or more undercuts, valleys adjacent one or more domes, etc. In another example, the seating component 930 includes a plurality of features 939, which may be one or more undercuts, valleys adjacent one or more domes, etc. In such examples, features can, at least in part, form one or more particle passages (e.g., where each particle passage includes an inlet and an outlet), which may be axially deviant.

As an example, a radial bearing assembly for a centrifugal pump can include a first component that includes a longitudinal axis and discrete radial surfaces separated by undercuts, the discrete radial surfaces disposed at a radial distance from the longitudinal axis; a second component that includes a longitudinal axis and a radial surface disposed at a radial distance from the longitudinal axis; and, formed by concentric alignment of the longitudinal axis of the first component and the longitudinal axis of the second component, a journal and bearing clearance, defined by the difference between the radial distance of the radial surfaces of the first component and the radial distance of the radial surface of the second component, and axially deviant particle passages defined by the undercuts and the radial surface of the second component. In such an example, the first component may be an impeller or a diffuser and the second component may be a diffuser or an impeller. As described in various examples, one or more other components may be a first or a second component that forms a journal and bearing clearance (see, e.g., the seating component 830 of FIG. 9).

As an example, a total journal surface or a total bearing surface of a component that defines, in part, an interface may include less than about 70% of a total surface of the component where the total surface is defined by a radius and an axial length of the component. As another example, a total journal surface or a total bearing surface may include less than about 50% of a total surface. As yet another example, a total journal surface or a total bearing surface may include less than about 30% of a total surface. As to component hardness, as an example, a component of a radial bearing assembly may include a Knoop hardness greater than about 500.

Although only a few example embodiments have been described in detail above, those skilled in the art will readily appreciate that many modifications are possible in the example embodiments without materially departing from a radial bearing assembly (or assemblies) for a centrifugal pump. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

The invention claimed is:

1. A radial bearing assembly for a centrifugal pump comprising:
   a first component that has a longitudinal axis and that comprises discrete radial surfaces separated by undercuts, the discrete radial surfaces disposed at a radial distance from the longitudinal axis, at least some of the undercuts cooperatively form at least one contiguous undercut surface extending about the first component;
   a second component that has a longitudinal axis and that comprises a radial surface disposed at a radial distance from the longitudinal axis, wherein the first component comprises a diffuser and the second component comprises an impeller or wherein the first component comprises an impeller and the second component comprises a diffuser; and
   formed by concentric alignment of the longitudinal axis of the first component and the longitudinal axis of the second component,
      a journal and bearing clearance, defined by the difference between the radial distance of the discrete radial surfaces of the first component and the radial distance of the radial surface of the second component, and
      axially deviant particle passages defined by the undercuts and the radial surface of the second component wherein an undercut surface area associated with the undercuts is at least about 25% of a sum of surface areas for the discrete radial surfaces.

2. The radial bearing assembly of claim 1 wherein the undercuts of the first component comprise helical undercuts.

3. The radial bearing assembly of claim 1 wherein the discrete radial surfaces of the first component comprise helically arranged surfaces.

4. The radial bearing assembly of claim 1 wherein an undercut surface area associated with the undercuts equals or exceeds a sum of surface areas for the discrete radial surfaces.

5. An electric submersible pump comprising:
   a rotatable shaft;
   an electric motor for rotating the rotatable shaft; and
   at least one radial bearing assembly that comprises
      a first component that has a longitudinal axis and that comprises discrete radial surfaces separated by undercuts, the discrete radial surfaces disposed at a radial distance from the longitudinal axis, at least some of the undercuts cooperatively form at least one contiguous undercut surface extending about the first component;
      a second component that has a longitudinal axis and that comprises a radial surface disposed at a radial distance from the longitudinal axis, wherein the first component comprises a diffuser and the second component comprises an impeller or wherein the first component comprises an impeller and the second component comprises a diffuser or wherein the first component comprises the shaft and the second component comprises an impeller or a diffuser; and
      formed by concentric alignment of the longitudinal axis of the first component and the longitudinal axis of the second component,
         a journal and bearing clearance, defined by the difference between the radial distance of the discrete radial surfaces of the first component and the radial distance of the radial surface of the second component, and
         axially deviant particle passages defined by the undercuts and the radial surface of the second component wherein an undercut surface area associated with the undercuts is at least about 25% of a sum of surface areas for the discrete radial surfaces.

6. The electric submersible pump of claim 5 comprising at least two radial bearing assemblies.

7. The electric submersible pump of claim 5 wherein the discrete radial surfaces of the first component comprise helically arranged surfaces.

8. A method comprising:
   providing a centrifugal pump that comprises at least one radial bearing assembly that comprises:
      a first component that has a longitudinal axis and that comprises discrete radial surfaces separated by undercuts, the discrete radial surfaces disposed at a radial distance from the longitudinal axis, at least some of the undercuts cooperatively form at least one contiguous undercut surface extending about the first component;
      a second component that has a longitudinal axis and that comprises a radial surface disposed at a radial distance from the longitudinal axis, wherein the first component comprises a diffuser and the second component comprises an impeller or wherein the first component comprises an impeller and the second component comprises a diffuser or wherein the first component comprises a shaft and the second component comprises an impeller or a diffuser; and
      formed by concentric alignment of the longitudinal axis of the first component and the longitudinal axis of the second component,
         a journal and bearing clearance, defined by the difference between the radial distance of the discrete radial surfaces of the first component and the radial distance of the radial surface of the second component, and
         axially deviant particle passages defined by the undercuts and the radial surface of the second component wherein an undercut surface area associated with the undercuts is at least about 25% of a sum of surface areas for the discrete radial surfaces;
   driving the centrifugal pump to pump a slurry; and
   passing a portion of the slurry through the particle passages.

9. The method of claim 8 wherein the providing comprises providing a multistage centrifugal pump that comprises an impeller for each of the multiple stages.

10. The method of claim 9 wherein the providing comprises providing at least two radial bearing assemblies to support a shaft for rotating the impellers of the multistage centrifugal pump.

11. A radial bearing assembly for a centrifugal pump comprising:
   a first component that has a longitudinal axis and that comprises discrete radial surfaces separated by undercuts, each of the discrete radial surfaces disposed at a radial distance from the longitudinal axis, at least some of the undercuts cooperatively form at least one contiguous undercut surface extending about the first component;

a second component that has a longitudinal axis and that comprises a radial surface disposed at a radial distance from the longitudinal axis, wherein the first component comprises a journal and the second component comprises an impeller or a diffuser; and formed by concentric alignment of the longitudinal axis of the first component and the longitudinal axis of the second component, journal and bearing clearances, each journal and bearing clearance defined by the difference between the radial distance of a respective one of the discrete radial surfaces of the first component and the radial distance of the radial surface of the second component, and axially deviant particle passages defined at least in part by the undercuts and the radial surface of the second component wherein an undercut surface area associated with the undercuts is at least about 25% of a sum of surface areas for the discrete radial surfaces.

12. The radial bearing assembly of claim 11 wherein the discrete radial surfaces separated by undercuts comprise domed surfaces.

13. The radial bearing assembly of claim 12 wherein the domed surfaces comprise domed surfaces formed by knurling, casting or peening.

14. The radial bearing assembly of claim 12 wherein the discrete radial surfaces separated by undercuts comprise helically arranged discrete radial surfaces.

15. A method comprising:

providing a multistage centrifugal pump that comprises an impeller for each of the multiple stages and at least two radial bearing assemblies to support a shaft for rotating the impellers of the multistage centrifugal pump, the multistage centrifugal pump further comprising:

a first component that has a longitudinal axis and that comprises discrete radial surfaces separated by undercuts, the discrete radial surfaces disposed at a radial distance from the longitudinal axis, at least some of the undercuts cooperatively form at least one contiguous undercut surface extending about the first component;

a second component that has a longitudinal axis and that comprises a radial surface disposed at a radial distance from the longitudinal axis, wherein the first component comprises a journal and the second component comprises at least one of the impellers or a diffuser; and formed by concentric alignment of the longitudinal axis of the first component and the longitudinal axis of the second component, a journal and bearing clearance, defined by the difference between the radial distance of the discrete radial surfaces of the first component and the radial distance of the radial surface of the second component, and axially deviant particle passages defined by the undercuts and the radial surface of the second component wherein an undercut surface area associated with the undercuts is at least about 25% of a sum of surface areas for the discrete radial surfaces;

driving the centrifugal pump to pump a slurry; and passing a portion of the slurry through the particle passages.

\* \* \* \* \*